United States Patent Office 3,272,086
Patented Sept. 13, 1966

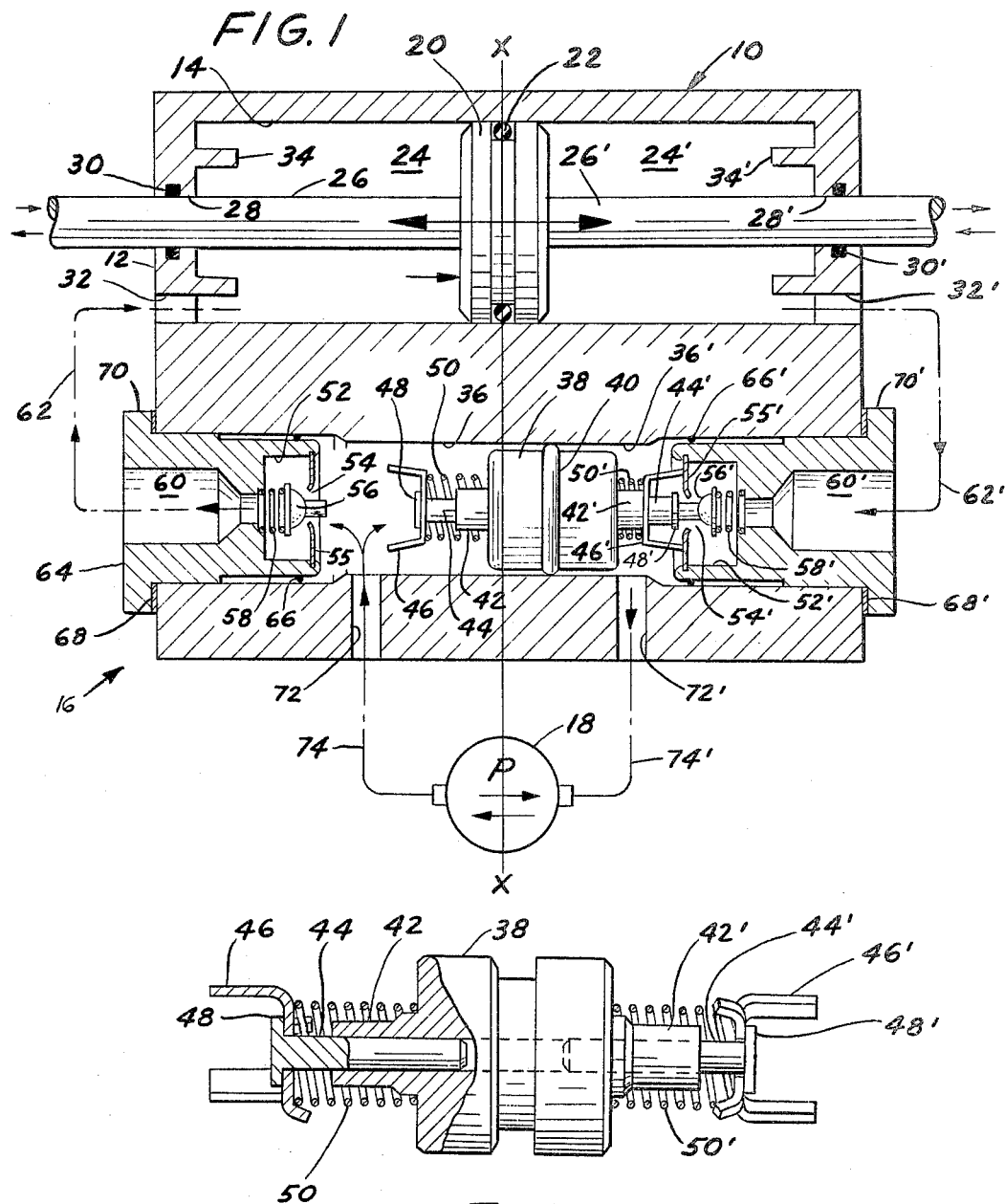
Sept. 13, 1966          R. A. SOETERS          3,272,086
REVERSIBLE SELF-LOCKING HYDRAULIC SYSTEM
Filed March 2, 1965
RAYMOND A. SOETERS
INVENTOR.
BY Walter Potorolo, Jr.
ATTORNEY

3,272,086
REVERSIBLE SELF-LOCKING HYDRAULIC SYSTEM
Raymond A. Soeters, Royal Oak, Mich., assignor to Holley Carburetor Company, Warren, Mich., a corporation of Michigan
Filed Mar. 2, 1965, Ser. No. 436,494
3 Claims. (Cl. 91—420)

This invention relates generally to hydraulic systems, and more particularly to a reversible, self-locking hydraulic system.

In a hydraulic system including a slave piston mounted in a cylinder in a manner so that the piston can be moved in either direction by supplying high pressure hydraulic fluid to either side of the piston, problems are sometimes encountered due to the feedback of external forces applied to the piston. In such applications, it may be desirable to hydraulically lock the piston in a manner so that it cannot react to these external forces.

Accordingly, a primary object of the invention is to provide a self-locking hydraulic system.

Another object of the invention is to provide a reversible hydraulic circuit having means to lock out feedback due to external forces.

Still another object of the invention is to provide a hydraulic system including a two-way slave piston, a reversible hydraulic circuit for operating said piston and means for preventing the effect of external feedback forces on said piston when said hydraulic circuit is not operating.

A further object of the invention is to provide such a system wherein the reversible hydraulic circuit includes a unique single porting piston assembly having captive springs at each end thereof, the latter being arranged in a manner to assure that the porting piston will always return to center, thus eliminating the need for calibrating the springs.

A still further object of the invention is to provide such a system wherein the two-way slave piston may be actuated in either direction immediately upon energization of the hydraulic circuit, the response time in either direction being substantially the same despite the uncalibrated springs.

These and other objects of the invention will become apparent upon reference to the following specification and attached drawings, wherein:

FIGURE 1 is a schematic illustration in partial cross-section of a hydraulic system embodying the invention.

FIGURE 2 is an enlarged view in partial cross-section of a portion of FIGURE 1.

Referring now to the drawings in greater detail, a hydraulic system 10 embodying the invention may be in the form of a casting or other suitably formed housing 12 including a cylinder 14 and a reversible valving system 16 including a pump 18 or other reversible means for supplying hydraulic fluid.

It will be apparent that the system 10 embodying the invention may be symmetrical about the line XX. This being so, the structure to the right of line XX in FIGURE 1 will be identified with reference numerals identical to those to the left of line XX, but with a superscript prime.

A slave piston 20 having the usual dynamic seal 22 is positioned in the cylinder 14 so as to divide the cylinder into hydraulically isolated chambers 24 and 24'. Shafts 26 and 26' connected to the piston 20 extend through the cylinder end openings 28 and 28' which are also provided with dynamic seals 30 and 30'. It will be understood that, in addition to the piston 20 being moved in either direction by operation of the valving system 16 to be described, external forces may be exerted on the piston 20 in either direction through the shafts 26 and 26', as represented by the arrows at the free ends of the shafts. Obviously, one of the shafts or stems could be omitted.

Referring now to the structure of FIGURE 1, it will be apparent that the housing 12 is formed to provide passages 32 and 32' communicating with the chambers 24 and 24'. Stop abutments or pins 34 and 34' may be employed to limit travel of piston 20. The casting 12 is also formed with a piston chamber which is divided into hydraulically isolated chambers 36 and 36' by a free piston 38, the latter being provided with the usual dynamic seal 40.

As better seen in FIGURE 2, the piston 38 has stepped extensions 42 and 44 extending from the left end thereof and similar members 42' and 44' extending from the right end thereof. Spider type stop members 46 and 46' are loosely fitted on the smaller outer extensions 44 and 44', respectively, and loaded outwardly toward retainers 48 and 48', respectively, by means of suitable resilient means, such as springs 50 and 50'. As illustrated, the smaller diameter members 44 and 44' may be press-fitted into openings formed in the outer faces of the larger members 42 and 42', and the spider members 46 and 46' may consist of stamped pieces having a plurality of legs pointing away from the piston 38 and a plurality of shorter projections pointing toward the piston and serving as retainers for the springs 50 and 50'.

Returning now to FIGURE 1, a smaller chamber 52 is formed adjacent and to the left of the chamber 36, there being an opening 54 through the wall 55 communicating between the chambres 52 and 36. A valve 56 is urged toward the opening 54 by a spring 58 located in the chamber 52, and an outlet passageway 60 is in constant communication with the chamber 52. A conduit 62 communicates between the outlet 60 and the slave piston chamber 24. An opening 72 formed through a wall of the housing 12 communicates chamber 36 with conduit 74 leading to the pump 18. For ease of assembly, the components 52–60 may be included in a separate assembly 64 which may be slidably or threadedly inserted in the chamber 36 of the housing 12. A seal 66 may be provided for the assembly 64, and a gasket 68 may be confined between the housing 12 and a collar 70 formed on the assembly 64.

The structure to the left of line XX just described is duplicated, in a mirror image relationship, in the portion of the casting 12 one the right of line XX.

*Operation*

While FIGURE 1 illustrates schematically a reversible pump 18 adapted to supply hydraulic pressure in either direction to the opening 72 or the opening 72', separate pumps or some other source of hydraulic pressure may be employed. The invention required only that a high pressure fluid can be supplied either to the chamber 36 or the chamber 36' to operate the piston 20 in either direction, or that the supply of the fluid to both chambers may be stopped, in which case the piston 20 is hydraulically locked in position in accordance with the invention, all in the manner described below.

Assuming now that the hydraulic fluid is being supplied by the pump 18 to the left hand chamber 36, it will be apparent that the free piston 38 will be moved all the way to the right in the chamber 36'; at the same time, the hydraulic pressure will move the valve 56 away from the opening 54 against the force of the spring 58. This high pressure fluid will then pass through the outlet opening 60 and the conduit 62 to the chamber 24 on the left hand side of the piston 20, moving the piston to the right, assuming, of course, that there is sufficient hydraulic pressure to overcome any opposing forces on the piston applied through the shafts 26 and/or 26'.

As mentioned above, the piston 38 will be moved to the right under the effect of the high pressure in chamber 36, and the ends of the spider member 46' will eventually abut against the wall 55' between the chambers 36' and 52'. Since the spider member 46' is loosely fitted around the extension 44', the piston 38 will continue moving to the right until the end of the extension 42' has contacted the center portion of the spider member 46'. In the meantime, the retainer or flange member 48' will have contacted the extension of the valve 56', moving the valve away from the opening 54', against the force of the spring 58'.

With valve 56' open, low pressure fluid being dumped from the chamber 24' may pass through the opening 32', the conduit 62', the opening 60', the chamber 52', past the valve 56', into the chamber 36' and out through the opening 72', and thence through the conduit 74' to the intake of the pump 18. This low pressure fluid operating on the back side of piston 38 cannot move the piston from its position at the right hand end of the chamber 36' due to the high pressure in the chamber 36.

It will be apparent that if the direction of the pump 18 is reversed, so as to supply hydraulic fluid to the conduit 74', then the operation described above will be reversed. That is, high pressure fluid supplied to the chamber 36' will open the valve 56' and will move the piston 38 all the way to the left, the latter movement mechanically opening the valve 56 against the force of the spring 58. The high pressure fluid can then pass through the openings 54' and 60', the conduit 62' and the opening 32', into the right hand chamber 24', so as to move the piston 20 to the left. Low pressure fluid from the left hand chamber 24 may be now be returned through the opening 32 and the conduit 62, past the open valve 56, through the chamber 36 and out the opening 72 to the low pressure side of the system.

It is apparent that the hydraulic system 10 includes means for moving the piston 20 in either direction, depending upon which direction the pump 18 is turning if the system is a closed system, or upon which side the high pressure fluid is supplied if the system is not closed. As stated above, it is sometimes desired that the piston 20 remain in its last assumed position, regardless of any external forces acting thereon until such time as the piston is deliberately moved in one direction or another by the application of high pressure fluid. The valving system 16 described above performs this function.

For example, assume that the piston 20 was moving to the right by the application of high pressure to the passage 32, in which case the various elements would be in the positions shown by FIGURE 1, and that the piston 20 had reached some desired position, such as exactly on the line XX. Since no further movement of the piston 20 is desired, the pump 18 would be stopped, in order to discontinue the supply of high pressure fluid to the passage 32. Under these conditions, the spring 58 in the chamber 52 will once again move the valve 56 against the opening 54 and, simultaneously, the spring 50' will urge the piston 38 to the left until such time as the retainer 48' has come into contact with the inside face of the spider 46', the latter, as previously mentioned, being loosely fitted around the extension 44'. The spring 58' will now be able to close the valve 56' against the opening 54'.

If some external force is now applied to the shaft 26 or the shaft 26', urging the further movement of the piston 20 in one direction or the other, this will merely tend to more tightly close either the valve 56 or the valve 56', depending upon the direction of the external force.

The advantages of the single piston assembly 38 described above will become more apparent when compared with a piston assembly wherein the spider member 46 is not included and the springs 50 and 50' are abutted directly against the walls 55 and 55'. In the latter type structure, if the forces of the springs 50 and 50' differed, then the piston 38 would be positioned off-center whenever the pump 18 was not being operated. Further, if the over-all length of the piston assembly between the ends 48 and 48' thereof were substantially the same, or just slightly smaller than, the distance between opposing ends of the valves 56 and 56', then the weaker of the two springs would naturally compress under the force of the stronger spring, causing the associated end of the piston to abut against the adjacent valve at a time when neither of the chambers 36 and 36' was being subjected to an increase in pressure from the pump 18.

In order to avoid the possibility of either of the valves 56 or 56' being opened as a result of the existence of a weak spring, the over-all length of the piston assembly would have to be shortened somewhat. If this were done, then once pressure were applied to the particular chamber (36 or 36') containing the weaker spring, there would be a delay in opening of the valve 56, and in movement of the piston 20, the delay being due to the piston assembly having to move a greater distance through the chamber containing the stronger spring.

It is thus apparent that if the springs 50 and 50' are merely compressed between the ends of the piston 38 and the end walls of the cylinder, such as the walls 55 and 55', then the springs must be perfectly calibrated in order that there not be (1) an undesired opening of the valve 56 or 56' when no hydraulic pressure is being applied and/or (2) a delay in the response or operation of the piston 20 in one direction, as compared to the other direction, when the pump 18 is in operation.

The spider members 46 and 46' have been included in the piston assembly contemplated by the invention in order to eliminate the manufacturing and assembling expense necessarily involved in having to provide such accurately calibrated or matched springs. In this construction, the springs 50 and 50' need only be strong enough to move the spider members 46 and 46' into contact with their respective retainers 48 and 48'. Obviously, the forces of the springs 50 and 50' may be considerably different from one another, certainly within normal manufacturing tolerances. As such, the over-all length of the piston assembly, i.e., the length between the outer faces of the retainers 48 and 48', may be maintained just slightly less than the distance between the ends of the valves 56 and 56'. Likewise, the over-all length between the outer ends of the spider stop members 46 and 46' may be just slightly less than the distance between the walls 55 and 55'. With the proposed construction, there will be no delay in the actuation of either of the valves 56 or 56', once pressure is applied to the chambers 36' or 36, respectively. That is, the response of piston 20 will be equal in either direction.

Not only is the piston assembly 38 of the invention an improvement over a piston assembly requiring accurately calibrated springs at its outer ends or in lieu thereof, a shorter over-all length, as just described, but it is also an economical improvement over a dual piston and multiple passageway system of the type described in U.S. application Serial No. 422,219, filed on December 30, 1964, in the name of Frederick J. Marsee.

It is apparent that the system 10 shown and described permits the slave piston 20 to be moved instantly in either direction toward its limit of travel against the stops 34 and 34'; however, whenever the supply of hydraulic operating fluid is stopped, the piston 20 is efficiently locked against further movement due to the application of external forces and the porting piston 38 will return to its central position.

While but one embodiment of the invention is shown and described, it is apparent that other modifications thereof may be possible within the scope of the following claims.

What I claim as my invention is:

1. A closed hydraulic system, comprising a two-way hydraulic piston, a source of hydraulic pressure, means for applying said hydraulic pressure to one side or the other of said piston, means for relieving the pressure on the opposite side of said piston, and means for locking said piston against movement due to external forces when said source of fluid is inoperative, said first mentioned means including a spring-loaded check valve and said means for relieving and said means for locking including a second spring-loaded check valve and a piston having dual springs and dual slidable retainer members operatively associated therewith for permitting said second check valve to close when said source of hydraulic pressure is inoperative and for providing instantaneous opening of said second check valve when said source of hydraulic pressure is operative.

2. The device described in claim 1, wherein said second movable piston includes a stepped extension formed on both ends thereof, a retainer formed on the outer end of each of said stepped extensions, a slidable member mounted on the smaller portion of each of said stepped extensions, and a spring mounted between each of said slidable members and the adjacent face of said free piston.

3. The device described in claim 2, wherein each of said slidable members includes a plurality of projections extending away from said piston and beyond said retainer and a plurality of other projections extending toward said piston and serving as a retainer for said spring.

References Cited by the Examiner
UNITED STATES PATENTS

| | | | |
|---|---|---|---|
| 2,720,755 | 10/1955 | Gardiner | 91—420 |
| 2,830,561 | 4/1958 | Lindstrom | 91—420 |
| 3,198,088 | 8/1965 | Johnson | 91—420 |

MARTIN P. SCHWADRON, *Primary Examiner.*

EDGAR W. GEOGHEGAN, *Examiner.*

P. T. COBRIN, *Assistant Examiner.*